Inventors
GERHARD SEULEN
FRIEDHELM REINKE
EDGAR STENGEL

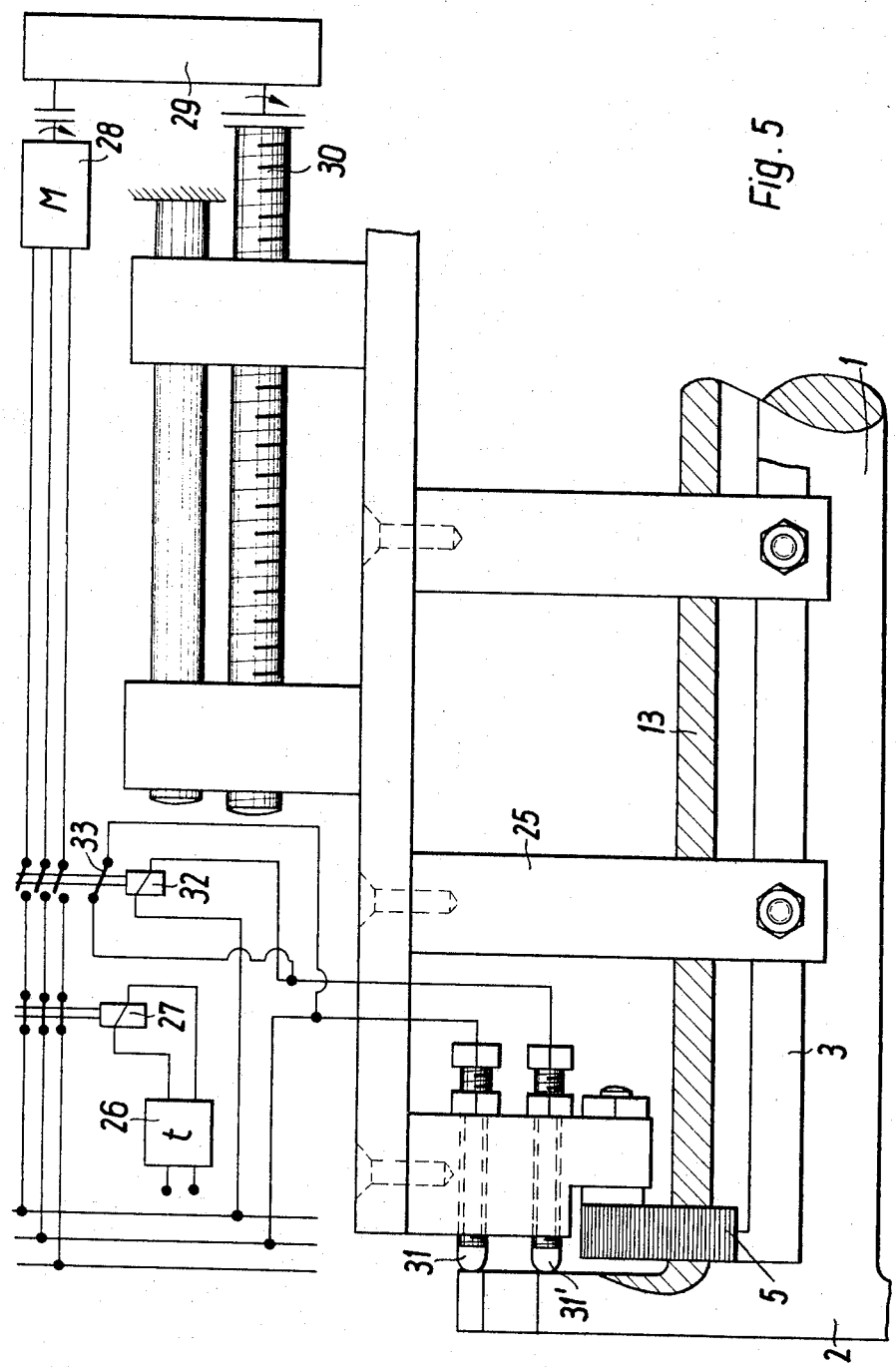

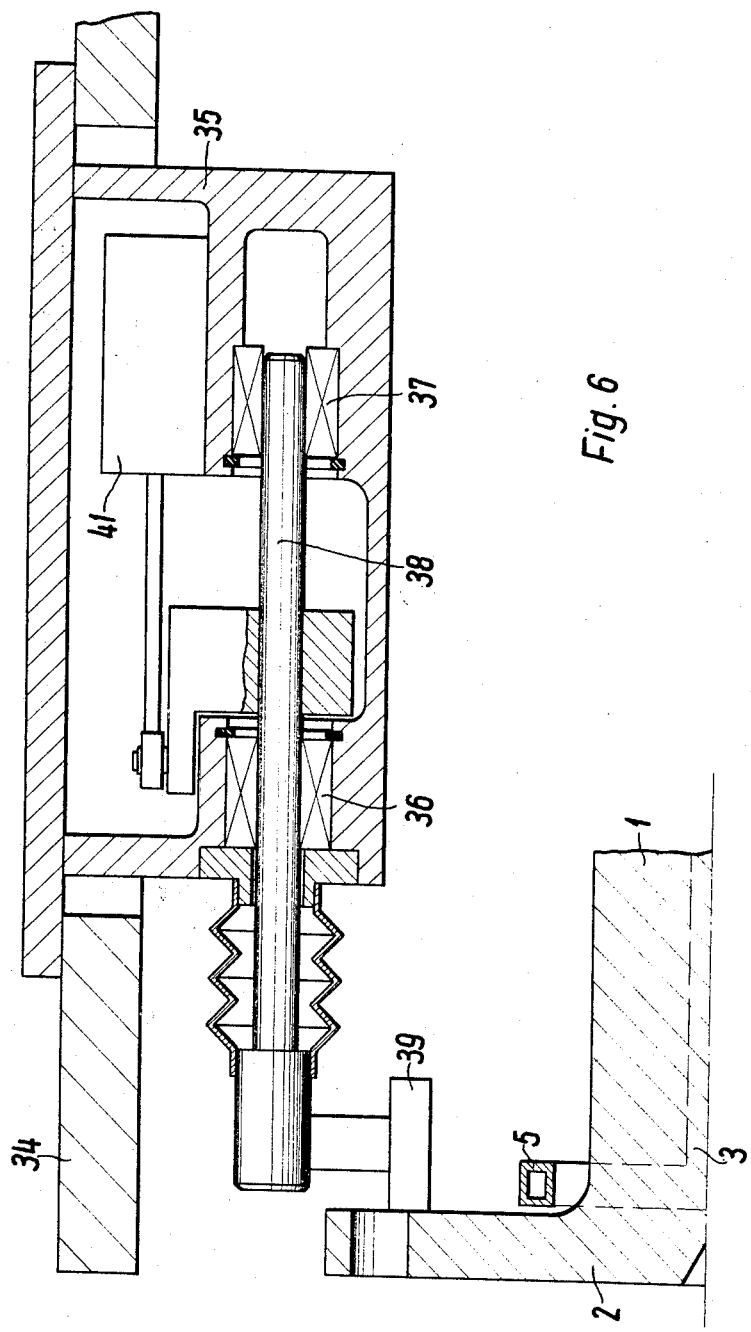

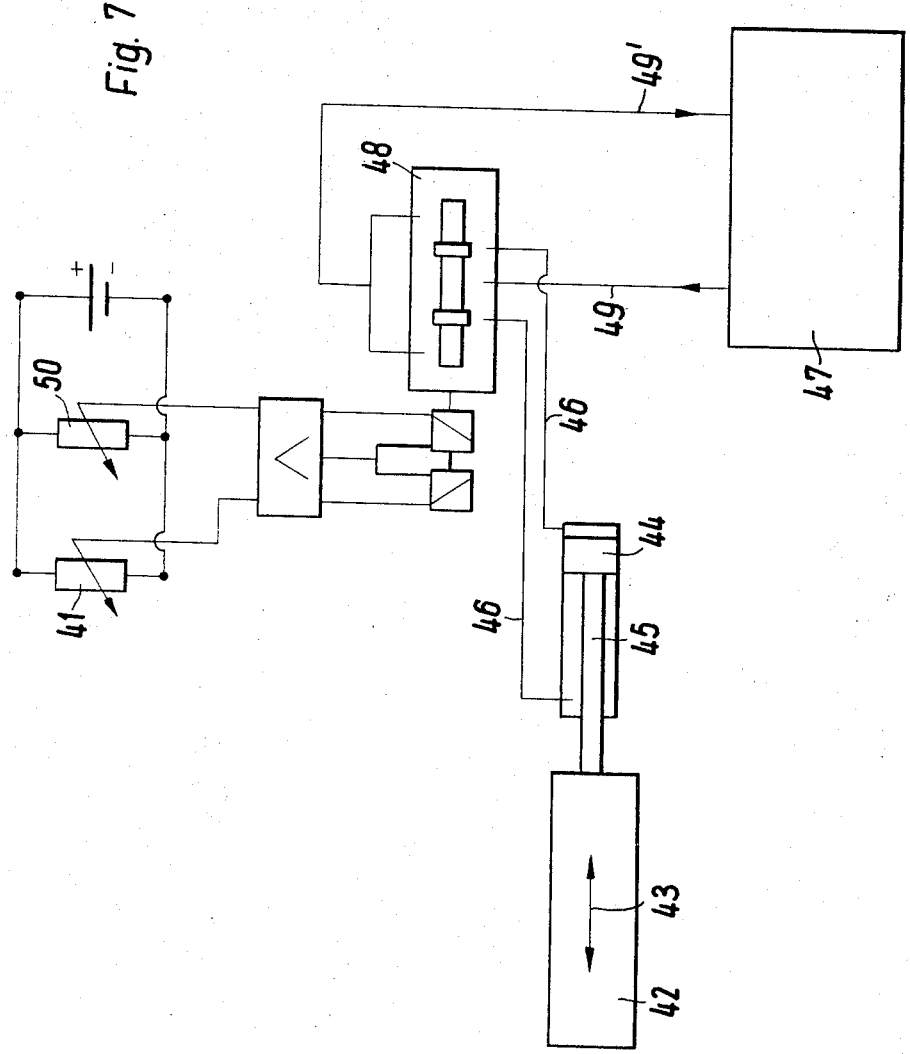

United States Patent Office 3,441,701
Patented Apr. 29, 1969

3,441,701
METHOD AND APPARATUS FOR INDUCTIVELY HEATING WORKPIECES COMPRISING A FLANGED SHAFT
Gerhard Seulen and Friedhelm Reinke, Remscheid, and Edgar Stengel, Wuppertal-Hahnerberg, Germany, assignors to AEG-Elotherm G.m.b.H., Remscheid-Hasten, Germany
Filed Apr. 1, 1968, Ser. No. 717,866
Claims priority, application Germany, Nov. 16, 1967, A 57,396
Int. Cl. H05b 5/02
U.S. Cl. 219—10.43
8 Claims

ABSTRACT OF THE DISCLOSURE

Workpieces comprising a flanged shaft are difficult to inductively heat by the rotary surface heating method to obtain depths of heating of differing degrees in the shaft and flange portions. This is particularly important when the thickness of the flange is less than the diameter of the shaft. The difficulty is overcome according to the invention by arranging the longitudinal elongate conductors of the heating inductor slightly parallel to the shaft during the total heating period, so that the coupling gap between the cross conductor and the flange is altered from a non-heating value to a heating value, the heating of the shaft being maintained.

---

Figure 1:
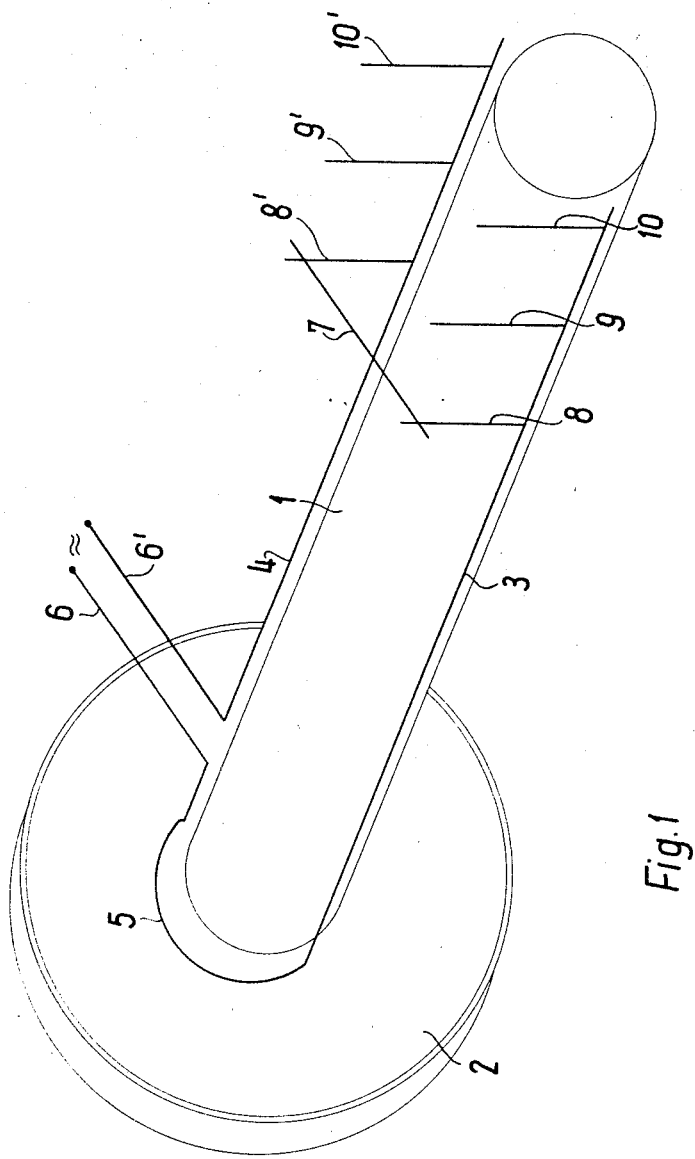

This invention relates to the inductive surface hardening of axially symmetrical elongate workpieces comprising a shaft provided at one end with a flange of considerably larger diameter than the shaft, whereby the depth of the heated and hence hardened zones on the shaft may be different from that on the fillet and/or flange portion of the workpiece, and particularly relates to the inductive heating of such workpieces which may be of different lengths, and in which the flange portion may have a thickness less than the diameter of the shaft thereof, and furthermore relates to the production of hardened zones in such workpieces which have differing depths.

Such workpieces have previously been surface hardened by a method of overall rotary surface inductive heating, in which the workpiece is mounted between centres and rotated about its axis of symmetry to be heated by a closed conductor loop above its surface, and subsequently quenched for instance whilst the workpiece rotates.

Differences in length between workpieces which may be treated according to the invention should not exceed the degree of take up available between the mounting centres for the workpieces. The diameters of the shaft and of the flange of workpieces heated according to the invention should however be the same for different workpieces.

It is particularly difficult and may in fact be impossible inductively to surface harden such workpieces if the cylindrical or tapering flanged shafts are to be provided with a substantially thicker hardened surface layer than the flange thereof or the fillet between the said flange and the shaft, by using an inductor in the form of a single heating conductor loop. Moreover owing to the wide variation in the pattern of heat flow it has previously been impossible inductively to harden such workpieces if the depth of heat penetration and the required depth of the hardened layer on the shaft is in excess of the actual thickness of the flange, and the invention provides a method of and apparatus for inductive heating capable of solving such hardening problems, by forming surface layers of different thicknesses on the shaft and the flange of the workpiece.

The invention consists of a method of inductively heating and hardening an elongate workpiece having a shaft and a plate-shaped flange at one end of the said shaft whereby the depth of heat penetration in the shaft is different from the depth of heat penetration in the flange comprising (a) heating the shaft of the workpiece with a closed heating conductor loop near the workpiece surface, positioned in relation to the workpiece so that the coupling gap between the conductor loop and the flange is such that heating currents are induced exclusively in the surface of the said shaft; (b) after a predetermined time shifting the heating conductor loop axially into a position so that the said coupling gap is reduced whereby heating currents are induced in the surface of the said flange and the fillet between the shaft and flange, as well as in the surface of the said shaft.

The inductive heating process of the invention thus begins with a wide coupling gap between the conductor loop and the fillet and flange surface. By subsequently using an alternating current of a frequency between 1 and 20 kc./s., only the surface of the shaft of the workpiece is initially heated. When the remainder of the time available to the end of the overall heating period equals the time required for inductively surface heating the fillet and the flange surface, the inductor is axially shifted towards the fillet and adjusted to provide the required coupling gap. The process of heating continues whilst this shift takes place. At the end of the total heating time i.e., before quenching, the workpiece will thus have been heated in a manner to provide the desired distribution of heat penetration of the various surfaces.

The temperature distribution, i.e., the hardening effect on the end of the shaft remote from the flange is not substantially affected by the shift of the inductor, since the power induced in the workpiece falls considerably when the coupling gap widens, the distance the inductor is shifted in the majority of practical cases is only a few millimetres. Consequently the exact location of the inductor when the heating process begins is of less consequence than its position after the shift.

In apparatus for putting the invention into effect, the inductor may be insulatedly mounted in a casing which can be moved parallel to the workpiece, and which preferably is formed from an electrically insulating material.

For accurately adjusting the coupling gap between the heating conductor loop and the fillet and flange surface a preferred feature of apparatus of the invention consists in providing the end of the said casing facing the flange surface, with sensing means for the flange surface, said sensing means being for example adjustable electrically-conducting contact pins, or electrical switches or rigid or movable feelers. Such sensing means are adapted to control regulating circuits which operate to maintain a coupling gap of predetermined dimension which is thus maintained in the event that the material of the workpiece expands during the heating process.

A particular and preferred feature of apparatus according to the invention is the provision of means for adjusting the heating conductor loop to the length of the particular workpiece being heated, in which the inductor comprises elongate heating conductors which extend parallel to the shaft of the workpiece, having at their ends remote from the flange of the workpiece relatively spaced contact lugs mounted therein, the two heating conductors being electrically connected by a short circuiting bridge adapted to be secured to a lug on each heating conductor. The short circuiting bridge preferably consists of a plate made of a material of high electrical conductivity associated with a cooling tube.

Figure 2:
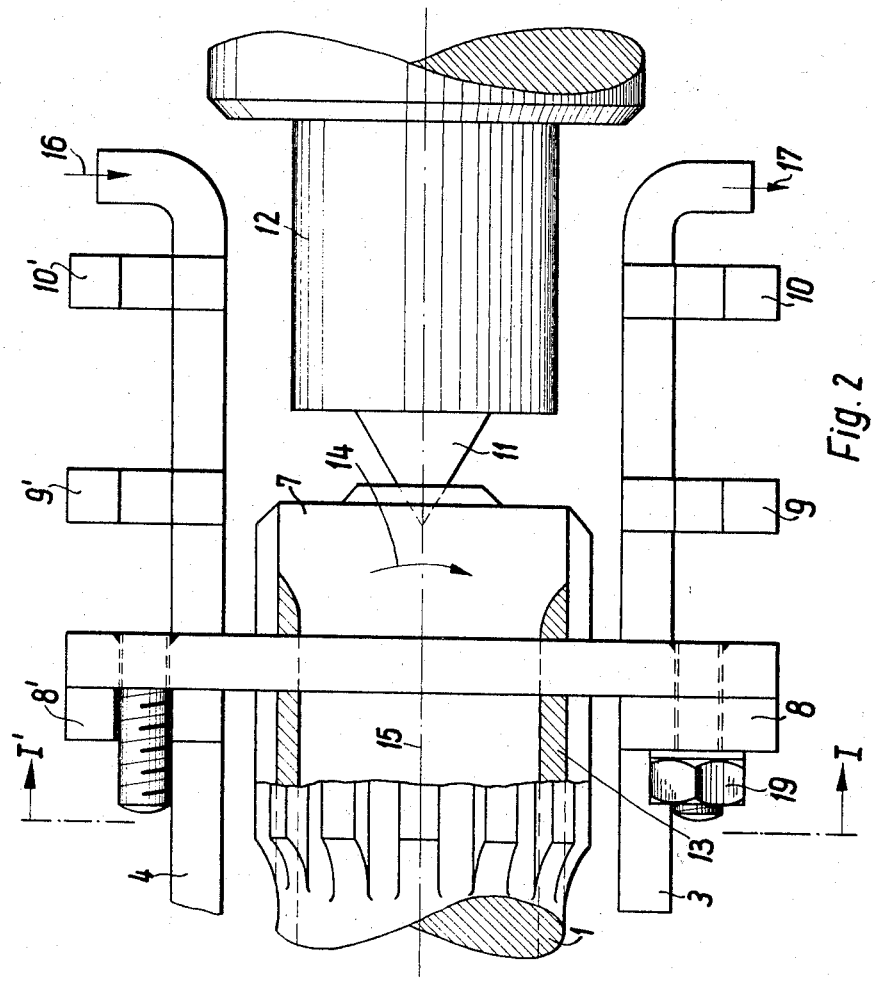
Figure 3:
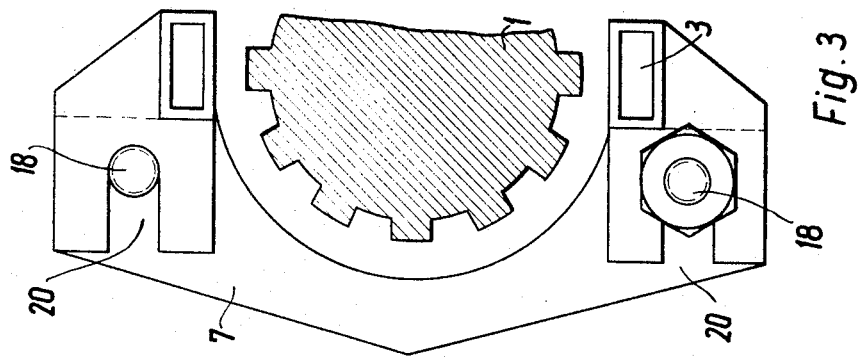
Figure 4:
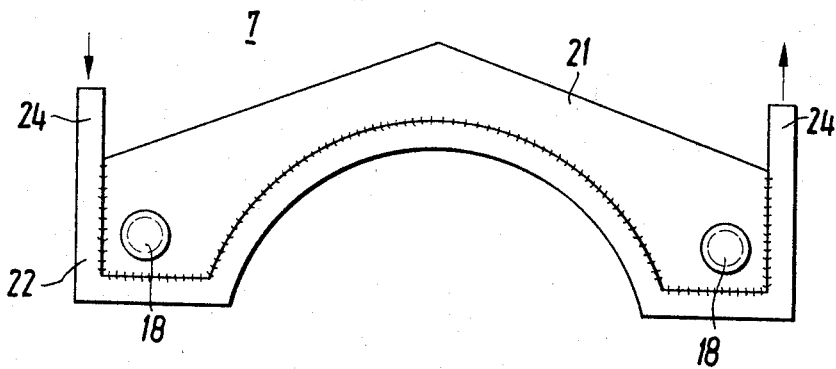

Embodiments of the method and apparatus of the invention are hereinafter described and illustrated in the accompanying drawings, of which FIGURE 1 is a schematic perspective view of the shape of the heating conductor loop, FIGURE 2 is a part longitudinal view of the heating conductor loop of FIGURE 1 in relation to one end of a mounted workpiece, FIGURE 3 is a part cross-section on the line I–I' of FIGURE 2, showing the construction of a heating conductor loop and of its lugs and associated short-circuiting bridge, FIGURE 4 is a side view of a short circuiting bridge, FIGURE 5 is a schematic longitudinal view of apparatus for performing the method of the invention, the said apparatus including sensing means for controlling the coupling gap, FIGURE 6 is a part longitudinal view of a form of construction in which the inductor shift is controlled by sensing means comprising a movable feeler pin, and FIGURE 7 is the circuit diagram of a hydraulically shiftable inductor controlled by a movable feeler.

Referring to the drawings, FIGURE 1 illustrates the shape of a workpiece that is to be treated. The contemplated workpieces are of the kind used for instance as rear axle half shafts in the construction of motor vehicles. They comprise an elongated cylindrical or slightly tapering shaft 1 and a plate-shaped concavely or convexly arched flange 2. A flanged shaft of such a kind may also possibly be provided with a splined head at its end remote from the flange.

For inductively heating the workpiece, a semicylindrical inductor loop comprising axial conductors 3 and 4 and a cross connection 5 is used. The cross connection 5 is so contrived that it is suitable for heating the surface of the flange and the region of the fillet between the shaft and the flange. The inductor loop is fed with a medium frequency alternating current through terminal connections 6 and 6'. The electrical connection required to close the loop through the axial conductors is provided by a short-circuiting bridge 7 which, according to the length of the workpiece, is electrically connected to a pair of lugs 8, 8' or 9, 9' or 10, 10'.

A view of the region where the lugs and the short circuiting bridge are located is shown in FIGURES 2 and 3, which include only one end of the workpiece 1 which is held by a centre 11 on a spindle 12, the workpiece being rotated about its symmetry axis in the direction indicated by an arrow 14. It is desired to provide the shaft with a hardened surface layer indicated at 13.

The water-cooled axial conductors 3 and 4, which are supplied with a liquid coolant entering and leaving at say 16 and 17 and which have a length corresponding to the longest flanged shaft that is to be hardened, are fitted with contact lugs 8, 8', 9, 9' and 10, 10'. As the short-circuiting bridge 17 can be bolted either to the right or left hand sides of the lugs, the illustrated three pairs of contact lugs permit the inductor to be adapted to workpieces of six different lengths. The short-circuiting bridge 7 is provided with threaded studs 18 and 18' respectively secured by nuts 19 in slots 20 of the lugs.

The short-circuiting bridge is thus a simple means of adapting the heating conductor loop to the length of the workpiece, which also prevents the spindle 12 which projects into the conductor loop from being heated. The method of securing the short-circuiting bridge in slots allows also the width of the coupling gap in the region of the bridge to be varied easily and the induction effect in this region to be progressively reduced.

A useful construction of the short-circuiting bridge 7 for practical use is more clearly shown in FIGURE 4. The bridge consists of a flat, suitably shaped metal plate 21 of high electrical conductivity. The periphery of the plate 21 facing the workpiece, where in practice the current densities are a maximum, is provided with a cooling tube 22 soldered to the plate along its peripheral contour. A liquid coolant is passed through the tube, entering for instance at 23 and leaving at 24. The threaded studs 18 for securing the bridge have already been mentioned.

FIGURE 5 illustrates the means provided for shifting the inductor in relation to the work. The drawing shows the arrangement at a time when the inductor has been shifted into the position required for inductively heating the flange, the fillet and the shaft.

The inductor which is secured to a horizontally movable casing 25 was initially in a position further to the right in the drawing when the heating process began. In this position the arcuate connecting conductor 5 cannot induce currents in the fillet or in the face of the flange. With the initial application of power to the inductor, a timing device 26 had been started. At the end of a preadjustable period, this device operated a relay 27 to start a servo motor 28 which shifted the inductor towards the flange 2 by gear means 29 and a feed screw 30.

In this sequence of events, as soon as the feeler pins 31 and 31' make contact with the flange they activate a relay 32 causing the electrical circuit energising the servomotor to break, further movement of the inductor being thus stopped At the same time the feeler pins 31 and 31' are short-circuited by the working contact 33 of the relay 32, the relay 32 therefore holding its position. This arrangement prevents the motor from being accidentally restarted and from further shifting the inductor as a result of for instance slight irregularities on the surface of the flange.

At the end of the prescribed heating time the workpiece is quenched in conventional manner by spraying and/or it may be lowered into a quenching bath. During or after the process of hardening the return of the inductor into its original position may be initiated.

FIGURE 6 illustrates the construction of a different arrangement for effectively controlling the shifting of the inductor for the purpose of heating the fillet region of the workpiece. The drawing shows a workpiece comprising a cylindrical shaft 1 with a flange 2 and the associated inductor 3. A special casing 35 containing the control means is attached to the inductor casing 34. The control casing contains a control pin 38 which is horizontally slidably movable in slide bearings 36 and 37. The end of the control pin facing the flange 2 of the workpiece carries a roller 39 which works as a feeler. The control pin 38 is forwardly biased by a spring (not shown in the drawing).

The control pin is coupled to a variable electrical resistor 40 in such a way that the resistance 41 of the resistor varies according to the position of the pin.

The effect in the overall circuit of the electrical resistor which is associated with the control pin will be understood from the system layout in FIGURE 7 which comprises a hydraulic and an electrical portion.

The inductor 42 in FIGURE 7 is shiftable in the directions indicated by an arrow 43. The shift is effected hydraulically, as indicated in the drawing by a piston 44 and a piston rod 45. The hydraulic medium may be pressurised oil which is admitted through a pipe 46 or a pipe 46' according to the required direction of shift. The hydraulic medium for operating the piston 44 is supplied from a reservoir 47 whence it is first conducted through pressure pipes 49 and 49' to a magnetic valve 48. The magnetic valve controls the admission and return of hydraulic fluid through the two pipes 46 and 46'. The magnetic valve is electrically controlled, the control signal being obtained from a comparison between two electrical quantities. One of these quantities is adjusted by a manually variable resistor 50. The second electrical quantity derives from the variable resistor 41 operated by the control pin. If both quantities are equal no shift of the inductor ensues.

The illustrated arrangement ensures that the coupling gap between the cross connector 5 of the inductor and the fillet is always accurately maintained when the inductor has been moved into proximity with the flange 2.

What is claimed is:

1. A method of inductively heating and hardening an elongate workpiece having a shaft and a plate-shaped flange at one end of the said shaft whereby the depth of heat penetration in the shaft is different from the depth of heat penetration in the flange comprising (a) heating the shaft of the workpiece with a closed heating conductor loop near the workpiece surface, positioned in relation to the workpiece so that the coupling gap between the conductor loop and the flange is such that heating currents are induced exclusively in the surface of the said shaft; (b) after a predetermined time shifting the heating conductor loop axially into a position so that the said coupling gap is reduced whereby heating currents are induced in the surface of the said flange and the fillet between the shaft and flange, as well as in the surface of the said shaft.

2. Apparatus for inductively heating an elongate workpiece having a shaft and a plate-shaped flange at one end of the said shaft; comprising centering means for holding a workpiece in the heating position; rotating means for rotating a said workpiece held between said centres; a closed conductor loop adapted to be placed in an initial heating position relative to a workpiece held between said centres and comprising two elongate parallel conductors joined at one end by a cross conductor, the said initial heating position being such that the coupling gap between the said cross conductor and an adjacent surface of the said flange is sufficiently large to inhibit heating of the said surface of the flange by the passage of alternating electrical heating current through the said heating inductor while the rotating shaft of the workpiece is heated by the passage of said heating current through the said two elongate parallel heating conductors; inductor shifting means for shifting the said heating conductor parallel to the said workpiece from the said initial heating position to a second heating position whereby the said coupling gap is reduced to a distance to allow the said adjacent surface of the flange to become heated by the passage of said heating current through the cross conductor while the said shaft continues to be inductively heated.

3. Apparatus according to claim 2, in which the said closed conductor is electrically insulatedly accommodated inside a casing, the said inductor shifting means being adapted to shift the said casing.

4. Apparatus according to claim 3, in which the end of the said casing adjacent to the flange of the said mounted workpiece is provided with one or more sensing means for determining the position of the said flange, and circuit control means responsive to the said sensing means for controlling the operation of the said inductor shifting means, whereby the coupling gap between the flange and the said cross conductor is maintained at a predetermined value.

5. Apparatus according to claim 4, in which the said sensing means comprise movable contact pins of electrically conducting material.

6. Apparatus according to claim 4, in which the said sensing means comprise electrical switch means or feelers.

7. Apparatus as claimed in claim 2, in which the said elongate conductors of the heating inductor are provided at their end remote from the said cross conductor thereof, with spaced electrical-conducting terminals disposed opposite to each other in pairs, and an electrically-conducting bridge adapted to connect each terminal of a pair of terminals whereby a portion of the two elongate conductors may be short-circuited.

8. Apparatus according to claim 7, in which the said bridge is provided by conduit means whereby the said bridge may be cooled by the passage of cooling fluid through said conduit means.

References Cited

UNITED STATES PATENTS

| | | |
|---|---|---|
| 2,293,534 | 8/1942 | Denneen et al. 219—10.79 X |
| 2,632,079 | 3/1953 | Body 219—18.5 |
| 2,643,325 | 6/1953 | Body et al. 219—10.41 |
| 2,797,288 | 6/1957 | Kiemele et al. 219—10.79 X |
| 3,337,200 | 8/1967 | Balzer 219—10.57 X |

RICHARD M. WOOD, *Primary Examiner.*

L. H. BENDER, *Assistant Examiner.*

U.S. Cl. X.R.

219—10.79, 10.57